United States Patent
Alamouti et al.

(10) Patent No.: US 12,095,624 B2
(45) Date of Patent: Sep. 17, 2024

(54) METHOD AND SYSTEM FOR DISTRIBUTED EDGE CLOUD COMPUTING

(71) Applicant: MIMIK TECHNOLOGY CANADA INC., Vancouver (CA)

(72) Inventors: Siavash M. Alamouti, Vancouver (CA); Fay Arjomandi, West Vancouver (CA); Michel Burger, Lafayette, CO (US)

(73) Assignee: MIMIK TECHNOLOGY CANADA INC., Vancouver (CA)

( * ) Notice: Subject to any disclaimer, the term of this patent is extended or adjusted under 35 U.S.C. 154(b) by 590 days.

(21) Appl. No.: 16/841,380

(22) Filed: Apr. 6, 2020

(65) Prior Publication Data

US 2020/0322225 A1  Oct. 8, 2020

Related U.S. Application Data

(60) Provisional application No. 62/926,455, filed on Oct. 26, 2019, provisional application No. 62/830,249, filed on Apr. 5, 2019.

(51) Int. Cl.
  *H04L 41/12* (2022.01)
  *H04L 67/141* (2022.01)
(52) U.S. Cl.
  CPC .......... *H04L 41/12* (2013.01); *H04L 67/141* (2013.01)
(58) Field of Classification Search
  CPC ...... G06F 9/5011; G06F 9/5072; G06F 9/547; G06F 2209/505; G06N 5/022;
  (Continued)

(56) References Cited

U.S. PATENT DOCUMENTS 10,791,063 B1 * 9/2020 Florissi ................ H04L 47/783
2013/0024901 A1  1/2013 Sharif-Ahmadi et al.
(Continued)

FOREIGN PATENT DOCUMENTS

CN  102970354 A   3/2013
CN  108322487 A * 7/2018
(Continued)

OTHER PUBLICATIONS

PCT International Search Report and Written Opinion issued in corresponding application No. PCT/IB2020/053285, dated Jul. 16, 2020.
(Continued)

*Primary Examiner* — Eyob Hagos
(74) *Attorney, Agent, or Firm* — Maschoff Brennan

(57) ABSTRACT

Embodiments of an edge cloud computing device are disclosed. In an embodiment, the edge cloud computing device includes an edge node activation module configured to discover one or more other edge cloud computing devices based on a first set of parameters to establish a connection therebetween. The edge node activation module is further configured to provide a microservice runtime environment to execute one or more microservices associated with the connection established between one or more edge cloud computing devices. The edge node activation module is further configured to: discover an existence of the one or more edge cloud computing devices regardless of an operating system and/or network type associated with the one or more edge cloud computing devices, discover capabilities and behaviour associated with the one or more edge cloud computing devices, and discover one or more microservices supported by the one or more edge cloud computing devices.

8 Claims, 6 Drawing Sheets

(58) Field of Classification Search
CPC ... H04L 67/02; H04L 67/1097; H04L 67/565; H04L 41/12
See application file for complete search history.

(56) References Cited

U.S. PATENT DOCUMENTS

| | | | |
|---|---|---|---|
| 2014/0297733 A1 | 10/2014 | Wang et al. | |
| 2016/0269482 A1* | 9/2016 | Jamjoom | H04L 67/1095 |
| 2017/0331812 A1 | 11/2017 | Lander et al. | |
| 2018/0082296 A1 | 3/2018 | Brashers | |
| 2018/0113790 A1 | 4/2018 | Chunduri et al. | |
| 2018/0267785 A1* | 9/2018 | Holman | G06F 9/5072 |
| 2018/0307514 A1 | 10/2018 | Koutyrine et al. | |
| 2018/0359201 A1 | 12/2018 | Rangasamy et al. | |
| 2019/0079744 A1 | 3/2019 | Bosch et al. | |
| 2019/0220703 A1 | 7/2019 | Prakash et al. | |
| 2019/0238636 A1 | 8/2019 | Li et al. | |
| 2019/0320038 A1* | 10/2019 | Walsh | G06F 9/542 |
| 2019/0354809 A1* | 11/2019 | Ralhan | G06F 16/116 |
| 2020/0042365 A1* | 2/2020 | Tanna | G06F 9/465 |
| 2020/0053026 A1* | 2/2020 | Rangachari | H04L 45/44 |
| 2020/0233403 A1* | 7/2020 | Gelbke | G06F 8/60 |
| 2020/0296603 A1* | 9/2020 | Suthar | H04L 67/1076 |
| 2021/0126986 A1* | 4/2021 | Rolf | H04L 67/52 |

FOREIGN PATENT DOCUMENTS

| | | | |
|---|---|---|---|
| CN | 109032567 A | 12/2018 | |
| CN | 109542457 A | 3/2019 | |
| CN | 109542639 A * | 3/2019 | ............ G06F 9/546 |
| CN | 110851145 A | 2/2020 | |
| WO | 2014/145877 A2 | 9/2014 | |
| WO | 2018/144060 A1 | 8/2018 | |
| WO | WO-2018197928 A1 * | 11/2018 | ............ B60J 7/223 |

OTHER PUBLICATIONS

International Search Report issued in corresponding application No. PCT/IB2020/060038, dated Feb. 1, 2021.
Written Opinion issued in corresponding application No. PCT/IB2020/060038, dated Feb. 1, 2021.
Fernandez, et al., Enabling the orchestration of IoT slices through edge and cloud microservice platforms. Sensors 19, No. 13, Jul. 5, 2019.
Varghese, et al., Next generation cloud computing: New trends and research directions. Future Generation Computer Systems 79, Sep. 7, 2017: 849-861.
Yousefpour et al., All one needs to know about fog computing and related edge computing paradigms, Journal of Systems Architecture 98 (2019) 289-330.

* cited by examiner

METHOD AND SYSTEM FOR DISTRIBUTED EDGE CLOUD COMPUTING

CROSS-REFERENCE TO RELATED APPLICATION

This application claims the benefit of U.S. Provisional Application Ser. No. 62/830,249, filed on Apr. 5, 2019 and U.S. Provisional Application Ser. No. 62/926,455, filed Oct. 26, 2019, which provisional applications are each incorporated herein by reference in its entirety.

FIELD OF THE INVENTION

The disclosure relates to cloud computing in general. In particular, the disclosure relates to methods and systems for distributed edge cloud computing.

BACKGROUND OF THE INVENTION

Massive growth of connected devices including sensors and machines is revolutionizing every aspect of human life. Socioeconomic impacts of such growth are significant and have already transformed various industries such as, but not limited to broadcasting, travel, transportation, banking, and retail. Concomitant with such growth are the challenges associated with the explosion of devices and exponential growth in personal digital content and machine generated data. Cloud and cloud computing have been major enablers for such growth. Today, most popular consumer and enterprise applications and solutions are hosted in data centers commonly referred to as the "cloud". Cloud computing has been essential for enabling applications like Facebook®, YouTube®, Instagram®, DropBox®, etc. The underlying architecture corresponds to a client-server architecture where certain nodes or computing devices act as servers and other nodes or computing devices act as clients. Most computing nodes today operate in a client-server mode where most of the servers are in data centers made up of server farms scattered around the world. The client-server architecture is highly efficient for hosting of applications that provide access to content and information from the servers to a plurality of client nodes. Applications are hosted on the servers that handle compute intensive tasks and the client software on the edge nodes is used for simpler functions such as rendering information for the end user. The major advantage of the existing architecture is rapid and low-cost deployment of (computing and/or storage intensive) applications on generic servers shared amongst many applications with the aid of virtualization and orchestration technologies.

Existing central cloud infrastructure may not meet the growing demands of the foreseeable future due to limited central cloud resources and network connectivity (or bandwidth). In other words, the current architecture makes central cloud resources and network connectivity to the central cloud a bottleneck for future growth. Moreover, latency requirements of some applications may not be satisfied by the existing cloud infrastructure. In addition, sending data from billions of edge nodes to millions of centralized cloud servers wastes bandwidth and energy that has serious social and economic implications.

Yet another disadvantage of central cloud architecture is the reliance on cloud service providers who have access to the applications and the data stored or processed in their servers. As a result, today, a handful of very large companies have control over the vast majority of consumer and enterprise data. Also, despite all the sophisticated security measures, storing data and hosting applications on third party resources exposes the owners of the information to risks. Cloud resources have been designed for easy access to millions of developers and application service providers which in turn has increased vulnerabilities and security holes. This has resulted in gross abuse of consumer and enterprise data privacy and security.

SUMMARY OF THE INVENTION

Systems and methods are disclosed that implement an effective and feasible approach to address the above highlighted challenges and disadvantages. In an embodiment, the system implements decentralization of the cloud by turning any computing device into a cloud server. By turning computing devices into cloud servers, it is possible to reduce the role of digital middlemen and third-party trust elements because central hosting services are not necessary for many applications. In this way, a physical edge cloud fabric is created that is potentially orders of magnitude larger than the current "central cloud" fabric.

Embodiments of an edge cloud computing device are disclosed. In an embodiment, the edge cloud computing device includes an edge node activation module configured to discover one or more other edge cloud computing devices based on a first set of parameters to establish a connection therebetween. The edge node activation module is further configured to provide a microservice runtime environment to execute one or more microservices associated with the connection established between one or more edge cloud computing devices. In an embodiment, the edge node activation module is configured to discover an existence of the one or more edge cloud computing devices regardless of an operating system and/or network type associated with the one or more edge cloud computing devices. The edge node activation module is further configured to discover capabilities and behavior associated with the one or more edge cloud computing devices and discover the one or more microservices supported by the one or more edge cloud computing devices. In an embodiment, the first set of parameters include a user account associated with each of the one or more edge cloud computing devices, a network associated with the one or more edge cloud computing devices, and a proximity of the one or more edge cloud computing devices.

The edge node activation module is further configured to dynamically form one or more clusters with the one or more edge cloud computing devices and communicate with the one or more edge cloud computing devices at a microservice level either directly or through other edge cloud computing devices across the one or more clusters. In an embodiment, the edge node activation module is further configured to connect with the discovered one or more edge cloud computing devices if the discovered one or more edge cloud computing devices chose to share data, services, and/or resources. The edge node activation module is further configured to expose the one or more microservices services through a common embedded web server. In an embodiment, one or more API endpoints for each microservice are accessible from the one or more edge cloud computing devices in a cluster through an API gateway. The edge node activation module is further configured to provide flexible container capabilities based at least in part on the respective computing environments associated with the one or more edge cloud computing devices. The respective computing environments run a container daemon to download, deploy, and operate the one or more microservices.

In an embodiment, the computing environment runs a container daemon to manage ad-hoc clusters of the one or more edge cloud computing devices. The edge node activation module further includes a webserver embedded within. The webserver is configured to provide container management APIs using specific language based on an operating system associated with the edge cloud computing device. The edge node activation module further includes one or more software libraries and corresponding APIs.

Computing devices and computer readable media having instructions implementing the various technologies described herein are also disclosed. Example computer readable media may comprise tangible, non-transitory computer readable storage media having computer executable instructions executable by a processor, the instructions that, when executed by the processor, cause the processor to carry out any combination of the various methods and approaches provided herein. Example computing devices may include a server or a client device comprising a processor, a memory, a client application and/or a network service configured to carry out the methods described herein.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION OF THE FIGURES

Figure 1:
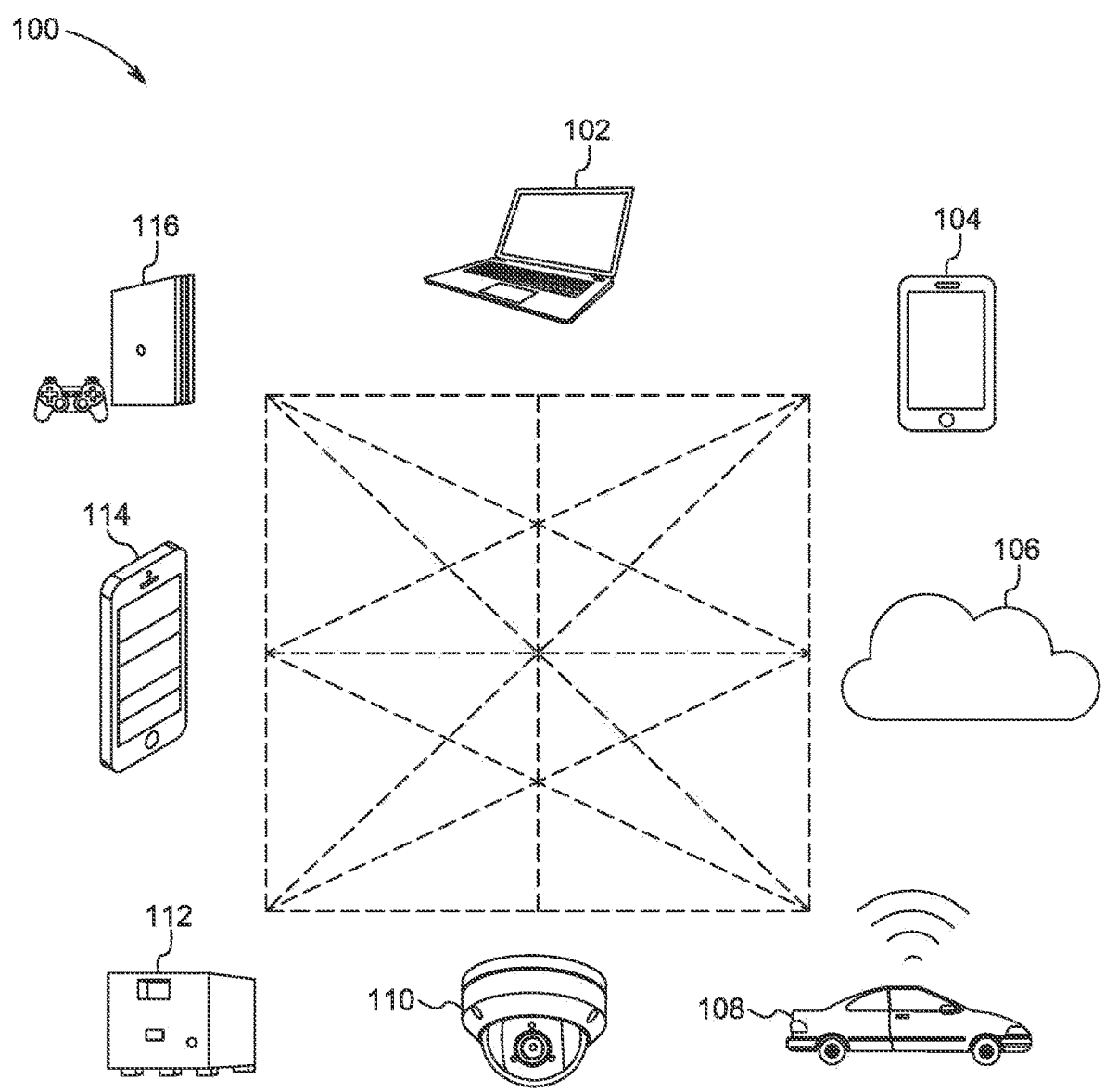
FIG. 1 depicts an embodiment of an edge cloud computing network.

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one with high skilled in the art, and the general principles defined herein may be applied to other embodiments and applications without departing from the scope of the invention. The present invention is not intended to be limited to the embodiments shown but is to be accorded the widest possible scope consistent with the principles and features disclosed herein.

Within the last decade, two fundamental trends have been witnessed that make the existing client-server architecture less efficient. The first trend is the explosion of computing devices and embedded computing, and the increasing capabilities of the edge cloud computing devices. For instance, there is more computing, memory and storage available in today's mobile phones than in powerful servers just a decade ago. This trend will continue for the foreseeable future as per Moore's law. The second trend is the enormous amounts of data generated on the edge cloud computing devices. With the advent of social media on mobile devices, very high magnitude of personal multimedia content is generated on devices (photos, videos, sensor data, etc.) than premium content from major studios and broadcasters hosted on central servers in the cloud. In the existing cloud computing systems using the server-client architecture, most of the data generated on the edge cloud computing devices is sent back to the central cloud for processing and to facilitate sharing.

As an example, there are currently over 80 million Sony PlayStation 4 (PS4™) consoles in peoples' homes. This represents over 600 million processor cores and about 40,000 petabytes of storage. In comparison, this represents much larger computing, storage and memory resources in the aggregate than the entire Amazon Web Services (AWS®) infrastructure. There are billions of PCs, set-top-boxes, game consoles, streaming players, routers, smart phones, tablets, and other computing devices that can potentially act as cloud servers and collectively have orders of magnitude more computing power than the existing "central cloud". The present disclosure provides for systems and methods to create a cloud fabric made up of billions of edge cloud computing devices (or nodes or edge nodes) that is orders of magnitude larger than the existing central cloud.

Embodiments of decentralized cloud architecture are disclosed. The disclosed approach does not require the creation of new network nodes with dedicated hardware. Instead, the disclosed architecture enables existing computing devices such as PCs, tablets, set-top-boxes (STBs), or even home routers to act as cloud server nodes at the edge of the cloud network when plausible. The disclosed approach does not require any change to the low-level design of these devices. All that is required is a downloadable application that runs on top of existing operating systems without any changes to the hardware or the OS Kernel of existing devices. Apart from providing a powerful arsenal for developers to decentralize the existing cloud infrastructure, the disclosed architecture provides consumers with more control over their personal data. Furthermore, amongst other things, the disclosed approach minimizes the cost of hosting and delivery of application and services, improves network performance and minimizes latency.

Embodiments of edge cloud platform are disclosed. The disclosed cloud platform accelerates the decentralization as the next revolution in computing. The primary step in cloud decentralization is to remove the constraint that servers can only exist in data centers. This is a fundamental constraint that defines the dominant client-server infrastructure for internet today. The present disclosure provides for an alternative architecture/platform and a pragmatic approach to achieve this by enabling any computing device to act as either a client or a server based on the real-time needs of an application. Also disclosed is a cloud platform to create the edge cloud fabric using edge node activation modules and one or more backend services.

The benefits and advantages of disclosed architecture include reduced cloud hosting costs, reduced communication bandwidth, increased network efficiency, reduced energy consumption and carbon emission, reduced latency, increased privacy and better control over consumer and enterprise data.

Embodiments of a method of providing edge cloud computing infrastructure (or a platform) are disclosed. The method is implemented in a communication network that includes one or more edge cloud computing devices in communication with a server computing device or a central cloud. The method includes executing, by a first edge cloud computing device, an edge node activation module. The method further includes discovering dynamically, by the first edge cloud computing device, other edge cloud computing devices independent of the operating system and network associated with the other edge cloud computing devices. The method further includes exposing, by the first edge cloud computing device, resource availability, capability, and functionality of the discovered other edge cloud computing devices. The method further includes forming and organizing, by the first edge cloud computing device, one or more clusters of the discovered other edge cloud computing devices. The method also includes communicating, by the first edge cloud computing device, within the one or more clusters and across the one or more clusters.

In an embodiment, the method includes, subsequent to executing the edge node activation module, searching, by the first edge cloud computing device, for a super edge cloud computing device (also referred to as "supernode" in the ongoing description). The super edge cloud computing device is configured to manage global discovery of nodes or edge cloud computing devices.

In an event of not finding a super edge cloud computing device during the searching, the method further includes designating, by the first edge cloud computing device, itself as the super edge cloud computing device. The method further includes communicating, by the first edge cloud computing device, global discovery of its existence and receiving, by the first edge cloud computing device, a list of one or more edge cloud computing devices within a scope of the first edge cloud computing device.

The method further includes receiving, by the first edge cloud computing device, a request for registration from one or more edge cloud computing devices entering subsequently in the one or more clusters and transmitting, by the first edge cloud computing device, to the registered one or more edge cloud computing devices a list of one or more other edge cloud computing devices within the scope of the first edge cloud computing device and/or within the scope of the registered one or more edge cloud computing devices.

FIG. 1 depicts an embodiment of an edge cloud computing network 100. In the existing "central cloud" model, as more devices are added or more content is generated by devices, more servers in data centers must be added to support them. With a distributed edge cloud computing network 100 as shown in FIG. 1, a cloud fabric can be created that scales with the number of edge devices. This reduces the need for additional servers in data centers as the number of edge devices and content generated by edge devices grow.

In the ongoing description, the "edge devices" are interchangeably referred to as "nodes" or "edge nodes" or "edge cloud computing devices". Accordingly, the "cloud" capacity is increased as the number of edge cloud computing devices grow. In addition, given that most of the data is produced at the edge, transport costs and latencies for applications are minimized. In the disclosed approach, most of the processing is performed at the edge, communication is kept as local as possible, and edge cloud computing devices collaborate and share computing and other resources. For the purposes of the ongoing description, the "central cloud", refers to one or more servers in data centers, remain as valuable resources as they may be indispensable for many applications that require central storage or processing. However, in the proposed edge cloud platform and architecture, the central cloud will no longer be a bottleneck or the "necessary" trust element and do not need to grow in proportion with edge nodes.

As shown in FIG. 1, the edge cloud computing network 100 includes a plurality of edge cloud computing devices, such as, a laptop 102, a tablet PC 104, a central "cloud" 106, a car infotainment system 108, a security camera 110, a server computing device 112, a mobile device 114, and a gaming console 116. In an exemplary embodiment, each of the edge cloud computing devices can be configured to act as a client or a server as per the need of the edge cloud computing network 100. Furthermore, the FIG. 1 shows connection or communication paths between the edge cloud computing devices as dashed lines. As would be appreciated by those skilled in the art, the architecture doesn't follow the conventional client-server mode where one or more devices are designated to always act as "servers" and the other devices always act as "clients".

In the proposed architecture of the edge cloud computing network 100, there is a fragmentation in operating systems and networks which may be a challenge to make the proposed architecture feasible. For example, each of the edge cloud computing devices may use different operating systems, such as, multiple variants of Linux®, android, iOS®, macOS®, Windows®, Fedora™, etc. Furthermore, the edge cloud computing devices may be configured to operate using different networking technologies, such as, fixed (Ethernet, fiber, xDSL, DOCSIS®, USB, etc.), mobile WAN (2G, 3G, 4G, etc.), Wireless LAN (WiFi®, etc.), Wireless PAN (Bluetooth®, WiGig, ZWave®, ZigBee®, IrDA, etc.), and machine networks (SigFox®, LoRa®, RPMA, etc.). To address this challenge, the proposed cloud architecture includes edge cloud computing devices (e.g. 114) that when activated are configured to connect, communicate and collaborate with other edge cloud computing devices across many fragmented operating systems and network technologies.

In another aspect of the disclosure, the availability of network resources may be a challenge in the edge cloud computing network 100. Accordingly, once edge cloud computing devices (e.g. 112, 114) act as servers, they can connect and communicate with other edge nodes using uplink network resources. Although, network connectivity is gradually becoming symmetrical, typically there are more downlink than uplink resources available. As an illustrative example, posting a video from an edge node to the central cloud to be consumed by three other edge nodes needs different uplink/downlink resources directly as compared to (directly) streaming the video from the source to destination nodes. In the centralized cloud network, there is one instance of uplink and three instances of downlink, and in the proposed decentralized edge cloud computing network 100, there are three instances of uplink (assuming none are behind a firewall). Therefore, availability of network resources would be an important aspect for the distributed edge cloud platform to be feasible. The solution to this is explained in relation to the "meritocracy" principle explained later.

In yet another aspect of the disclosure, unlike servers in data centers, most edge nodes may be nonpersistent in nature. There may be less control over their availability and reliability, especially with battery operated mobile devices. The proposed edge cloud computing architecture overcomes this challenge by a "microservice" approach explained below.

With the decentralized edge cloud, all nodes including the "central cloud" (e.g. 106 in FIG. 1) can act as cloud servers and there is no designated permanent trust element. Edge nodes or edge cloud computing devices are configured to communicate directly, collaborate and share resources directly without resorting to a third-party trust element. Furthermore, the ongoing trends in the software industry makes the proposed decentralization very feasible. The complexity of managing software solutions made of large number of components in the past led to monolithic solutions. However, the evolution of virtualization technology towards lighter container management platforms like Docker® & CoreOS®, the consumerization of on-demand IT and the ease of rich communication (API), has reduced the complexity significantly. A good software design practice is to develop solutions as a collection of many instances of single purpose, well-defined components referred to hereinafter as "microservices". To achieve higher efficiency of the software solution in the proposed architecture, programming using ephemeral microservices, also referred to as "server-less" architecture, is implemented where microservices are instantiated (launched and run) based on API calls made to the microservice itself.

In an exemplary embodiment, the cloud is extended to the edge by recognizing and exposing computing resources and utilizing them in an opportunistic way when available. Further, adding analytics to the way ephemeral microservices are deployed based on the availability, policy and context (including social and other application level events), enable optimal deployment of applications on the edge cloud computing network 100.

The disclosed architecture assumes that existing edge cloud computing devices can be easily turned into edge cloud servers (or edge cloud server computing devices). It is envisaged under the scope of the description that developers should be able to build applications (supported by the edge cloud) with as little effort as possible. Given the heterogeneous nature of the edge cloud computing devices, the disclosed approach assigns functional roles based on device capabilities. For ease of application development by developers, similar API semantics as that of the central cloud, for instance, Amazon Web Services® (AWS) or Microsoft Azure® are implemented and followed. Furthermore, a light container to run the microservices and the semantics of existing container technologies, such as, for instance, Docker® or CoreOS®, are implemented.

In the disclosed approach, an edge node or an edge cloud computing device is configured to demonstrate a plurality of capabilities to become a potential edge cloud server or edge cloud server computing device. The plurality of capabilities includes the ability to discover the existence of other edge nodes or edge cloud computing devices regardless of the operating system (OS) or network associated with them. The plurality of capabilities also includes the ability to discover other nodes' capabilities and behavior (e.g. hardware specs, OS, persistency, etc.). The plurality of capabilities further includes the ability to discover one or more microservices supported by other edge nodes or edge cloud computing devices and dynamically form clusters along with other edge nodes or edge cloud computing devices.

In another embodiment, the plurality of capabilities further includes the ability to communicate with other nodes at the microservice level either directly or through other nodes across different clusters and connect with other nodes if they chose to share data, services, and/or resources. In a still further embodiment, the plurality of capabilities further includes the ability to adapt to assigned functions and roles based on resources and capabilities and process and analyze data locally. Furthermore, the plurality of capabilities further includes the ability to be as secure and trustable as the central cloud.

In an embodiment, the configuration of the edge node or the edge cloud computing device to demonstrate the plurality of capabilities is achieved in a platform-agnostic approach. In an embodiment, a downloadable application-level software (e.g. edge node activation module) is provided that turns any edge cloud computing device into an edge cloud server and as a result builds an end-to-end edge cloud platform. It is to be noted by those skilled in the art that the proposed approach requires no changes to the device hardware, OS Kernel, or drivers and works on most modern hardware (PCs, STBs, routers tablets, smart phones, etc.). It is also to be noted that the proposed software-level application has a very small memory footprint and supports microservices that can be easily loaded, run and stopped across the edge cloud computing devices.

Furthermore, the disclosed approach supports multi-tenancy, multiple applications and microservices with a single instance of software to support multiple customers. The disclosed cloud platform has a light, but highly scalable backend (services) hosted on a "central cloud" (e.g. 106 in FIG. 1) and uses a bootstrap mechanism for registration of the nodes or other edge cloud computing devices. The disclosed cloud platform provides the ability to create dynamic clusters of edge nodes within a same network, proximity and (user) account and to manage mobility characteristics (appearing and disappearing) of nodes inter and intra clusters.

In an embodiment, the edge cloud computing network 100 provides for management of communication between the edge nodes or edge cloud computing devices either directly or through intermediate nodes and dynamic instantiation of backend resources or services based on demands from the edge nodes. In addition, edge cloud computing network 100 creates effective persistence by pulling collaborating edge nodes and/or resources dynamically.

To utilize the power of edge nodes and create a massive decentralized edge cloud, the disclosed approach considers and implements various principles in the edge cloud architecture. The first principle of decentralization implemented by the disclosed approach is "meritocracy". All nodes have an equal opportunity to participate in the edge cloud computing network 100. Nodes may take any role based on their capabilities. Capabilities that are enabled by the node owner are stored in the node profile. For instance, a node with large storage can become a "cache node" or a "backup storage node", a node with great network connectivity can be a "proxy node", and a persistent node can become the holder of knowledge (e.g., device and capability/role profiles) for a cluster of nodes and so on. Meritocracy prevents the need to provision central elements with predefined roles which leads to a hierarchical structure of nodes.

In an embodiment, other principles, such as, "transparency", that are necessary for meritocracy to work are also implemented in the disclosed approach. For instance, the nodes should tell the truth regarding their profiles in a transparent manner or else the principle of meritocracy cannot be applied effectively. The disclosed architecture removes incentives to lie (e.g. not providing any node-specific privileges or rights). Even when there is no apparent incentive to lie (e.g., provide false information, misleading information, or disinformation), the disclosed architecture implements a mechanism to blacklist nodes that lie about their profile to harm the operations of a cluster in the edge cloud computing network 100. In addition, the meritocracy may change with time and nodes may upgrade or downgrade their capabilities and profiles. The disclosed architecture accommodates any such changes to the nodes in real-time.

The second principle of decentralization implemented by the disclosed approach is "distributed discovery". A node in the edge cloud computing network 100 needs to discover other nodes. In the ongoing disclosure, discovery is intended to be a "filtered search" operation based on a scope. Illustrative and non-limiting examples of a scope include a user account (nodes registered under the same account ID), network (nodes that are members of the same link-local cluster network), proximity (nodes which are reporting themselves as physically present at a geographical location or within an area defined by a geospatial query). In an embodiment, the discovery process uses any combination of these or other scopes without a dedicated central node, for instance, a central node acting as a presence server. If a node sits behind a firewall and is not reachable from outside, it should rely on any nodes that are reachable to become discoverable.

The third principle of decentralization implemented by the disclosed approach is "clustering". Nodes communicate mostly in (constrained) clusters. The disclosed communication framework in the edge cloud, therefore, takes this into account when assigning roles and responsibilities to nodes within a cluster. A cluster is formed by a first active node (or a first edge cloud computing device) based on a given scope. When a node is "activated", it first looks for a "supernode" (also referred to as "super edge cloud computing device" in the ongoing description). The supernode oversees global discovery and holds knowledge of the edge cloud. If no supernode is found, the first node (or the first edge cloud computing device) declares or designates itself as the supernode. If a communication network is available, the supernode then informs global discovery of its existence and receives the list of nodes within the defined scope. To maintain efficiency, the supernode informs other nodes within its scope. Subsequently, a better supernode may be identified, and that better supernode can them inform the global discovery of its existence and then function as the supernode.

Once a cluster has been created by the supernode, subsequent nodes entering the cluster are configured to, discover the existing supernode, register themselves to the supernode, and receive the list of nodes within their scope. The new nodes inform other nodes within their scope of their existence. The disclosed edge cloud implements this bootstrap model to avoid overloading any nodes, whether global or local, and therefore reduces traffic and chattiness and creates a light and scalable architecture. Given the potential mobility of the nodes, presence notification is a function of the node itself along with the responsibility to decide which other nodes it wants to notify. Therefore, the disclosed edge cloud architecture doesn't implement a single global presence server or a point of registration in the disclosed edge cloud computing network. Similarly, the disclosed architecture doesn't have a "keep alive" mechanism at the infrastructure level between the nodes. In an embodiment, such mechanism can be delegated to microservices if needed in certain scenarios.

The fourth principle of decentralization implemented by the disclosed approach is "microservice to microservice communications". To create a distributed edge cloud fabric, applications on edge cloud computing devices or nodes may communicate directly without a third-party trust element. This can allow the devices to connect the edge nodes together at the network level. Microservices running on the edge nodes need to communicate directly. Furthermore, edge nodes are configured to load, start, and stop microservices on any other edge node in the edge cloud computing network 100. This configuration ensures that microservice management across the disclosed cloud platform remains distributed without the need for a central entity.

In an embodiment, the microservices enabled on the edge nodes expose their services through a common embedded webserver. API endpoints for each service are accessible from all other edge nodes in an edge cluster. In environments that can run container daemons (e.g. Linux), the disclosed edge cloud platform provides functionalities to manage ad-hoc clusters of edge nodes. In environments that cannot run container daemons (e.g. smart phones), the disclosed edge cloud platform provides additional "light" container capabilities with the ability to download, deploy and operate microservices.

The fifth principle of decentralization implemented by the disclosed approach is "dynamic resource instantiation". For decentralization to be efficient, it is desirable to have very little overhead associated with the nodes to join a cluster, leave a cluster, or get assigned resources. For the purposes of the ongoing description, the solution implemented by the disclosed edge cloud architecture is referred to as "dynamic resource instantiation". According to this principle, signaling and data resources are deployed dynamically (by backend service) based on a demand from edge nodes within one or more clusters thereby eliminating the need to reserve computing resources. This increases efficiency and reduces cost by dynamically deploying the end points (e.g. SEP, BEP) which are instantiated only when needed. The disclosed cloud platform assists the edge nodes to setup tunneling opportunistically to increase signaling and data bandwidth efficiency. Resources are deployed based on parameters such as, but not limited to, time to go-live, number of concurrent connections, and communication protocols (HTTP, SSH, Web socket or UDP tunneling). If desired, end points can be deployed on available computing resources within the closest proximity of a given cluster.

The sixth principle of decentralization implemented by the disclosed approach is "collaboration". In order to leverage the collective power of edge nodes in the decentralized edge cloud network, it is desirable that the edge nodes collaborate and share resources. The sharing of decentralized cloud resources is desirable to be as seamless as in case of a central cloud. As a first step, the disclosed cloud architecture is able to uses the collective resources of all the edge cloud computing devices. For instance, a video is recorded in HD format on the mobile phone 114 and the recorded content is seamlessly stored on the laptop 102 or even a connected storage dongle. As a next step, the disclosed architecture enables sharing of resources with friends and family. For instance, allowing family members to share a Network Attached Storage (NAS) as a family resource. In an embodiment, the disclosed architecture also provides the ability to lease computing resources to strangers. This way, a cloud fabric is created from numerous edge nodes that is orders of magnitude larger than the central cloud.

The seventh principle of decentralization implemented by the disclosed approach is "infrastructure independence". As describe earlier, for cloud decentralization, it is desirable that the disclosed cloud platform is agnostic to operating systems, network (type and technology) and location. Due to various reasons, there have been many failed industry attempts to standardize decentralized communication between nodes. Therefore, the proposed decentralized cloud platform is independent of the evolution of the operating systems and networks. In other words, the disclosed cloud platform operates on top of existing operating systems and networking standards at the application layer. This principle ensures that the disclosed cloud platform is deployed and maintained in the long-term with minimal or no dependencies.

Figure 2:
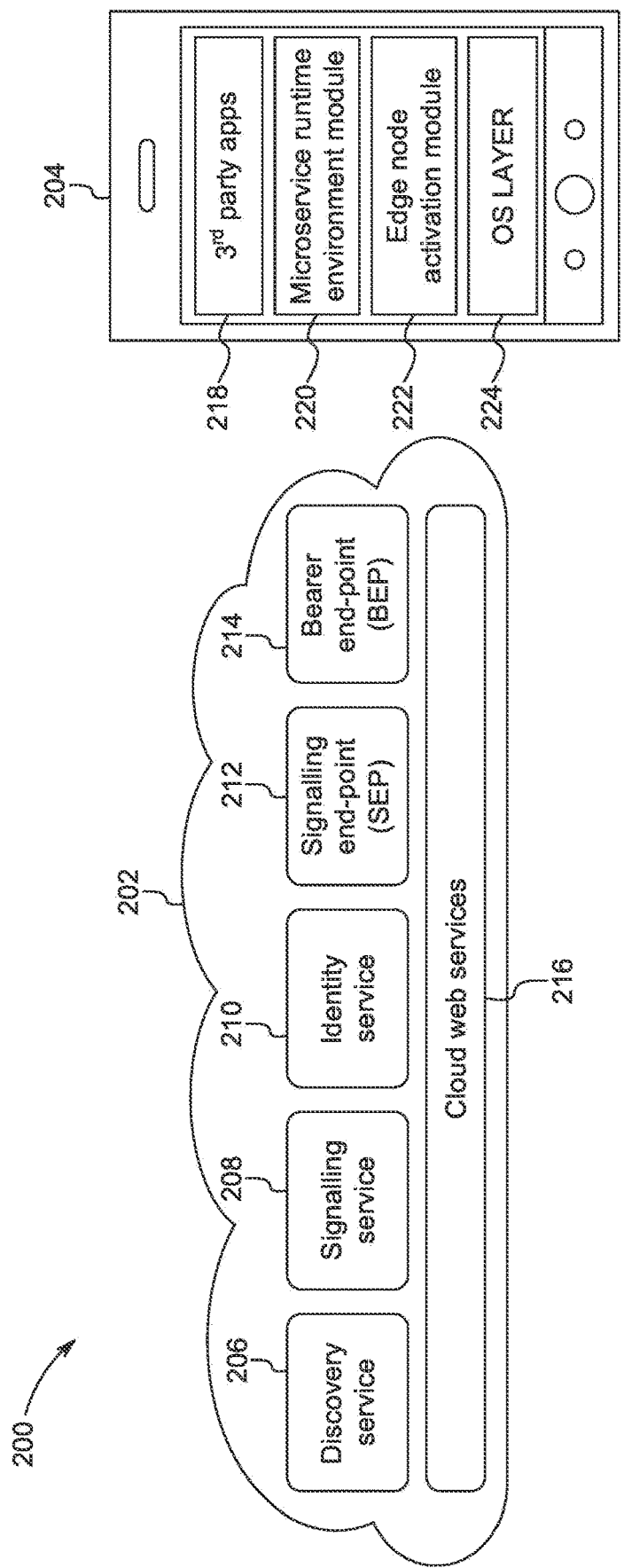
FIG. 2 illustrates fundamental building blocks of edge cloud architecture in accordance with an embodiment.

FIG. 2 illustrates fundamental building blocks of edge cloud computing architecture in accordance with an embodiment of a distributed edge cloud platform 200. Based on the above described principles, the disclosed distributed edge cloud platform 200 is designed and developed. It is envisioned to be a pragmatic way of enabling edge cloud by configuring every edge cloud computing device to function as an edge cloud server. As described earlier, such configuration is performed in a completely distributed fashion agnostic to hardware platforms, operations systems and underlying networking technologies. The disclosed cloud platforms, microservices, edge nodes (or edge cloud computing devices), and cloud clusters are configured to run on any operating system and to communicate over any network. Furthermore, the disclosed cloud platform and distributed cloud services are independent of any infrastructure.

As shown in FIG. 2, the distributed edge cloud platform 200 is an end-to-end system that includes central and edge elements that are its fundamental building blocks. The central element includes a backend services module 202 provided by a server computing device and the edge element includes the edge node activation module 222, and one or more microservices (e.g., 318, 320, 322 as described later with reference to FIG. 3). It will be appreciated by those skilled in the art that the disclosed architecture is intended to be distributed and that the elements (central or edge) can reside anywhere on any reachable edge cloud computing device (e.g., 102, 104, 106, 112).

Referring to the central elements of the distributed edge cloud platform 200, the backend services module 202 is hosted on servers reachable through the internet and provides necessary services to support the edge nodes or edge cloud computing devices across the edge clouds. For the purposes of the ongoing description, an edge cloud is defined as a collection of nodes (e.g. 102, 104), each with a globally unique ID, based on a context or a scope of capability of the particular device. In an embodiment, a given node may be a member of multiple clusters (e.g. see node 426 in FIG. 4). For example, a first cluster can correspond to a user account cluster, which is the cluster of nodes belonging to the user that registered them. A second cluster can correspond to a network cluster which is the link-local network cluster it is physically connected to. A third cluster can correspond to a proximity cluster which is the cluster of nodes within a certain surrounding area.

In an embodiment, the backend services module 202 is configured to provide one or more backend services that include a discovery service 206, a signaling service 208, an identity service 210. The signaling service 208 further provides resources such as a signaling endpoint (SEP) 212, and a bearer endpoint (BEP) 214. The backend services module 202 is hosted using cloud web services 216 such as, but not limited to Amazon Web Services® (AWS) in the server computing device (e.g. 112) or in the cloud 106.

In an embodiment, fragments or parts of the discovery service 206 and the signaling service 208 are implemented both on the backend server (e.g. 112) and on edge nodes (e.g. 102). For instance, network proxies (or nodes) in each cluster are parts of the signaling service 208 and supernodes (or super edge cloud computing devices) in each cluster are part of the discovery service 206. As can be appreciated by those skilled in the art, the disclosed cloud architecture departs from the existing notion of "service in the cloud—client on the edge". Its value comes from distribution of services over the entire range, from central cloud (e.g. 106) all the way to the edge nodes (as explained later with reference to FIG. 4).

The discovery service 206 is configured to hold and provide the knowledge to form one or more clusters, the overall status of the clusters, and the nodes within them. Once a cluster is formed, any new node registers with the supernode that subsequently informs the discovery service 206 via the supernode. In order to reduce traffic for scalability, updates from the supernode to the discovery service 206 happen in an opportunistic fashion and only when a change occurs in the one or more clusters.

In an embodiment, the discovery service 206 is configured to perform a reachability test to a supernode. When a supernode registers itself, the discovery service 206 tests for reachability. The supernode might be behind a firewall and while it can initiate a call to the discovery service 206, the discovery service or other external nodes might not be able to imitate a call to the supernode. In such cases, the discovery service 206 will request the signaling service 208 to dynamically deploy a signaling endpoint (SEP) (e.g. 212) for the cluster. Subsequently, the discovery service 206 returns the SEP address to the supernode.

In yet another embodiment, the discovery service 206 is configured to store a complete inventory of nodes and cluster profiles. This inventory includes details of computing resources on all the nodes, status of each node, location of each node, and services available on each node. The inventory further includes the end-to-end network topology to reach each node and the clusters, the reachability of the clusters, and the availability of resources and other pertinent information. In other words, the discovery service 206 has complete visibility to all resources across the edge cloud computing network 100 and can supply this information to dynamically deploy services on any available resource within the network in real-time. In an embodiment, the disclosed architecture uses standard amazon semantics to make it easier for developers to expose the resources in a similar fashion as in case of central cloud resources.

In an embodiment, the identity service 210 corresponds to a third-party identity software as a service (SaaS), for example based on the OAuth2.0, which resides in the public cloud and creates and maintains authentication profiles of nodes. In an embodiment, the disclosed cloud platform uses the identity service 210 for authorization of nodes by means of token generation and management for one or more token holders. The token holder can be the edge node activation module (e.g. 222, 308), the microservice (e.g. 318, 320, 322) using the edge node activation module, the application developer using the edge node activation module as well as the end-user of the application. The disclosed cloud platform uses the tokens to verify the credentials, legitimacy of the token holder, and authorize access to the one or more backend services provided by the backend services module 202. In an embodiment, the authorization is performed through the use of Jason Web Tokens (JWT) and a subset of standard "claims" for verifying the identity of the token holder.

The signaling endpoint (SEP) 212 and the bearer endpoint (BEP) 214 are both resources deployed dynamically and on demand based on a request received from, for example, the discovery service 206 or the signaling service 208.

Turning now to the edge elements of the distributed edge cloud platform, the edge computing device 204 includes an edge node activation module 222. As described earlier, the edge node activation module 222 sits on top of an OS layer 224 and provides a microservice runtime environment for executing the one or more microservices using the microservice runtime environment module 220. One or more 3rd party applications 218 are also hosted in the edge cloud computing device 204 that are serviced by the edge node activation module 222.

In an embodiment, the edge node activation module 222 is configured to turn any edge device (or edge cloud computing device) into a cloud server and extend the cloud computing infrastructure to that new edge. Edge devices can be any device with basic computing capability such as a laptop (e.g. 102), a set-top-box, a residential and IoT gateway, a game console connected TV, a car infotainment system (e.g. 108), a smart phone (e.g. 114), etc. Any edge device can download the edge node activation module 222 and execute it to "become" a cloud server. For the purposes of the ongoing description, any edge device that has executed the edge node activation module 222 is referred to as "node". Such nodes have one or more characteristics that are intended for the disclosed edge cloud platform and architecture. The one or more characteristics include the ability to dynamically discover each other (or other nodes) independent of the OS and network and include the ability to expose the computing and available capability and functionality to each other. The one or more characteristics further include the ability to form and organize into clusters (edge clusters) and communicate within the clusters even with no Internet availability, and across clusters.

The disclosed edge cloud platform operates by the formation of cluster nodes in accordance with the third principle of clustering as described supra. One or more cluster are formed by a first active node (or first edge cloud computing device) based on a particular scope. When a node (e.g. first edge cloud computing device) is activated (enabled with edge node activation module 222), it first looks for a supernode which oversees global discovery and holds the knowledge of the edge cloud. If no supernode is found, the first node declares itself as the supernode. If internet is available, the supernode then informs global discovery of its existence and receives the list of nodes within the defined scope. To maintain efficiency, the supernode informs other nodes within its scope.

Following the creation of a cluster by the supernode, subsequent nodes entering the cluster discover the existing supernode, register themselves to the supernode, and receive the list of nodes within their scope. The new nodes inform other nodes within their scope of existence. This bootstrap model is used by the disclosed cloud architecture to avoid overloading any nodes, whether global or local, and therefore to reduce traffic and chattiness. Given the potential non-persistency of the nodes, presence notification is intended as a functionality of the node itself along with the responsibility to decide which other nodes it wants to notify.

As explained above, the edge node activation module 222 can reside on any edge cloud computing device or server and can be made available for various hardware platforms and operating systems. In an embodiment, the edge node activation module 222 corresponds to an application-level software and can therefore be downloaded on many types of edge cloud computing devices. The backend services module 202 provides one or more backend services hosted on central cloud (e.g. 106) or any reachable and reliable computing resource with sufficient computing and memory and provide necessary services to support the edge nodes.

Figure 3:
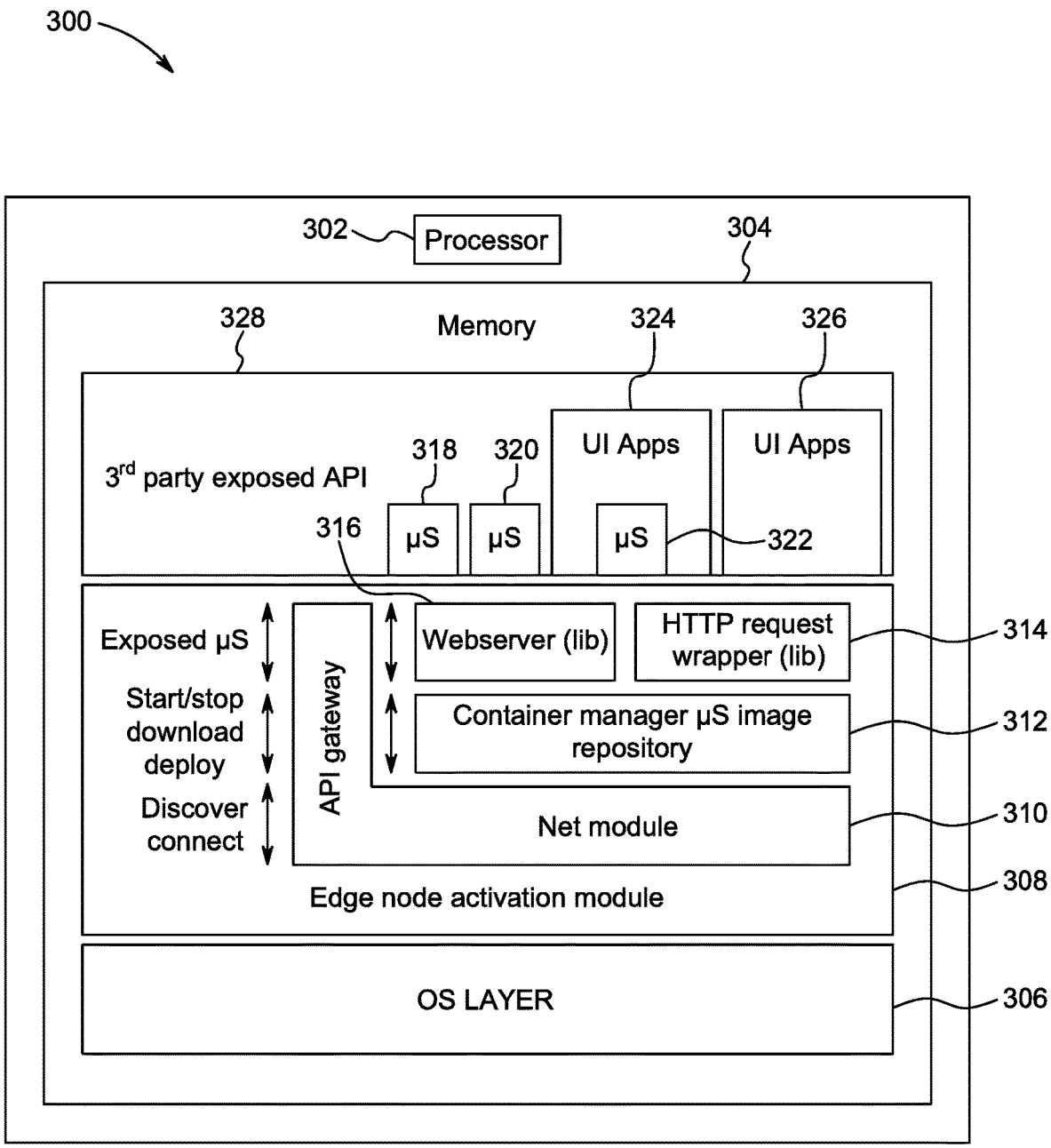
FIG. 3 shows an edge cloud computing device in accordance with an embodiment.

FIG. 3 shows an edge cloud computing device 300 in accordance with an embodiment. As shown, the edge cloud computing device 300 includes a processor 302 coupled to a memory 304. The memory corresponds to non-transitory computer readable medium having instructions implementing the various technologies described herein. Example computer readable media may comprise tangible, non-transitory computer readable storage media having computer executable instructions executable by the processor 302, the instructions that, when executed by the processor, cause the processor to carry out any combination of the various methods and approaches provided herein. Although not shown, it may be appreciated that all the edge cloud computing devices (102, 104, 108, 110, 112, 114, 116, 204) and the central cloud (e.g. 106) include at least a processor (e.g. 302), a memory (e.g. 304), and/or various other applications or modules stored in the memory which when executed by the processor(s) carry out the methods and approaches described herein.

The memory 304 includes an OS layer 306 and an edge node activation module 308. The edge activation module 308 further includes a Net module 310 having an API gateway. The edge activation module 308 also includes a container manager microservice (µS) image repository 312, HTTP request wrapper (lib.) 314, and an embedded webserver 316. As explained earlier, the edge node activation module 308 is configured to expose one or more microservices to one or more edge nodes. In an embodiment, the edge node activation module 308 is configured to start/stop, download, deploy any service in the edge cloud and expose the services using the API gateway. To this end, the edge node activation module 308 is configured to discover, connect and communicate with other edge nodes in one or more clusters (within or across). The memory 304 also includes one or more microservices (µS) depicted as 318, 320 and 322 in FIG. 3. The microservice 322 is shown to be a part of user interface (UI) apps 324. The memory 304 also includes other UI apps 326 without a microservice therein. All the microservices (318, 320 & 322) and the UI apps (324 & 324) are accessible through a 3rd party exposed API depicted as 328 in FIG. 3.

In an embodiment, the edge node activation module 308 corresponds to a collection of software libraries and corresponding APIs. It is intended that developers can also use the software libraries and APIs to efficiently solve the fundamental challenge of networking nodes in the new hyperconnected and highly mobile distributed edge computing world. The edge node activation module 308 can be delivered in a heterogeneous environment, regardless of OS, manufacturer, and connected network associated with any edge cloud computing device. Furthermore, the edge node activation module 308 can run (be executed) on any PC, server, mobile device, fixed gateway, autonomous car gateway, connected TV or even in the cloud, depending on the application use case. As described earlier, once the edge node activation module 308 is loaded onto an edge device, it becomes an edge cloud node.

As shown in FIG. 3, the edge node activation module 308 resides between the operating system layer 306 and the end-user applications (e.g. 324, 326). There are several microservices (e.g. 318, 320, 322) available from the edge node 300 and the edge node activation module 308 provides the ability for 3rd parties to develop their own microservices. The edge node activation module 308 also provides a microservice runtime environment. As described earlier, by incorporating the edge node activation module 308, computing devices are transformed into intelligent network nodes or edge nodes, that can form one or more clusters. The edge node activation module 308 takes away complexity of networking among distributed edge cloud nodes thereby enabling developers to focus on their solution in a microservice model even on small mobile devices (e.g. 114).

Nodes in a cluster are configured to take a specific role or combinations of roles, depending on physical hardware capability, OS, attached network connectivity, types of microservices running on each node and usage/privacy policy settings. Some roles are assigned through a process of election, considering other nodes within the cluster at any given time, while others are assigned through a process of selection. As described earlier, one of the most important roles in a cluster is that of the supernode (or a super edge cloud computing device), to which a node is elected by all member nodes. In a trivial case of a single-node cluster, a node serves as its own supernode. A supernode is configured to be the bearer of information regarding a cluster and all its member nodes. It is the "single source of truth" for the cluster. The supernode is configured to maintain information related to other nodes, microservices deployed on each node, as well as historical artifacts from the operation of edge node activation module 308. The supernode is configured to assign roles such as link-local proxy and link-local cache to other nodes in the cluster. A link-local proxy node supports communication in cases where cluster nodes reside behind a firewall. On the other hand, a node with large amounts of physical storage can be assigned the link-local cache role for the cluster.

For each node, the edge node activation module 308 supports a unique user and multiple microservices and application providers (otherwise called "tenants"). In other words, even if a user has loaded multiple applications on a mobile device all of which employ the edge node activation module 308, functionality and capabilities are related to (and authorized for) that user.

In an embodiment, the edge node activation module 308 provides discovery, connection, and communication among edge devices, both at physical and microservice levels. For example, the edge node activation module 308 provides for node and service discovery by auto-discovery and auto-routing for all nodes with instances of edge node activation module in local and global network(s). Similarly, the edge node activation module 308 provides for node and service connection in ad-hoc edge-cloud of nodes form a self-organizing cluster. In an embodiment, the edge node activation module 308 is configured to manage the one or more microservices by loading, running and managing microservice instances. As described earlier, the edge node activation module 308 includes an edge web server for providing a microservices runtime environment.

As described earlier, nodes with the edge node activation module 308 are configured to discover, connect and communicate with each other. In an embodiment, discovery is a "filtered search" operation, based on one or more scopes that corresponds to a user account i.e. nodes registered under the same account ID. In an embodiment, the edge node activation module 308 employs the OAuth 2.0 based OpenID standard through a third-party Identity SaaS provider (used as the identity service 210 provided by the backend services module 202). The scope may also correspond to a network, such as nodes that are members of the same link-local cluster network. The link-local identifier in this case is formed by combining the public IP address and the link-local network address. The scope may also correspond to proximity, such as. nodes which are reporting themselves as physically present at a geographical location or within an area defined by a geospatial query. The discovery process executed by the edge node activation module 308 can use any combination of the above described scopes. Furthermore, nodes and microservices running on nodes have unique identifiers, such as a specific microservice (e.g. a drive) on a specific node is addressable uniquely, locally and globally.

In addition, the edge node activation module 308 provides microservice runtime environment to expose the services associated with microservices through a common embedded webserver. API endpoints for each service are accessible from all other nodes in an edge cluster through the API gateway which is part of the net module 310. The edge node activation module 308 complements container daemons (or Docker®) in two different ways. In environments (e.g. Linux®) that can run container daemons, the edge node activation module 308 provides functionalities to manage ad-hoc clusters of edge nodes as described earlier. In environments that cannot run container daemons (e.g. smart phones), the edge node activation module 308 provides additional "light" container capabilities with the ability to download, deploy and operate microservices. The embedded webserver (e.g. 316) provides a subset of container management (e.g. Docker®) APIs with one or more constraints. The one or more constraints include use of a specific language based on the underlying OS (Java for android, objective c for iOS®, etc.). The one or more constraints further include use of the web server provided by the edge node activation module 308 by the microservices that run on the "light" container environment (provided by edge node activation module 308) to optimize the usage of limited resources on the underlying platform.

The edge node activation module 308 allows developers to build and host microservices on any node. The disclosed cloud architecture also offers various microservices, utilizing the edge node activation module 308, to speedup application development and enable developers to immediately take advantage of the distributed edge cloud platform. For example, in case of a drive microservice, abstracts access to storage available on edge nodes and distributed file management via a popular API can be provided. In another illustrative example, a beam microservice is provided that beams content from a node to node(s) and/or to service(s), in a peer-to-peer, one-to-one and one-to-many fashion.

As describe earlier, the SEP and BEP are resources that can be deployed dynamically by the signaling service, dynamically based on the demand or based on nodes within clusters. As a result, there is no need to reserve computing resources. This increases efficiency and reduces the cost by deploying the end points only when needed. The SEP is used for signaling communication while BEP is used for data communications and jointly they assist the nodes to setup tunneling opportunistically to increase signaling and data bandwidth efficiency. SEP and BEP are deployed based on parameters such as, but not limited to time to go-live, number of concurrent connections, and communication protocols (HTTP, SSH, Web socket or UDP tunneling). If desired, end points can be deployed on an available computing resources within the closest proximity of the cluster.

Figure 4:
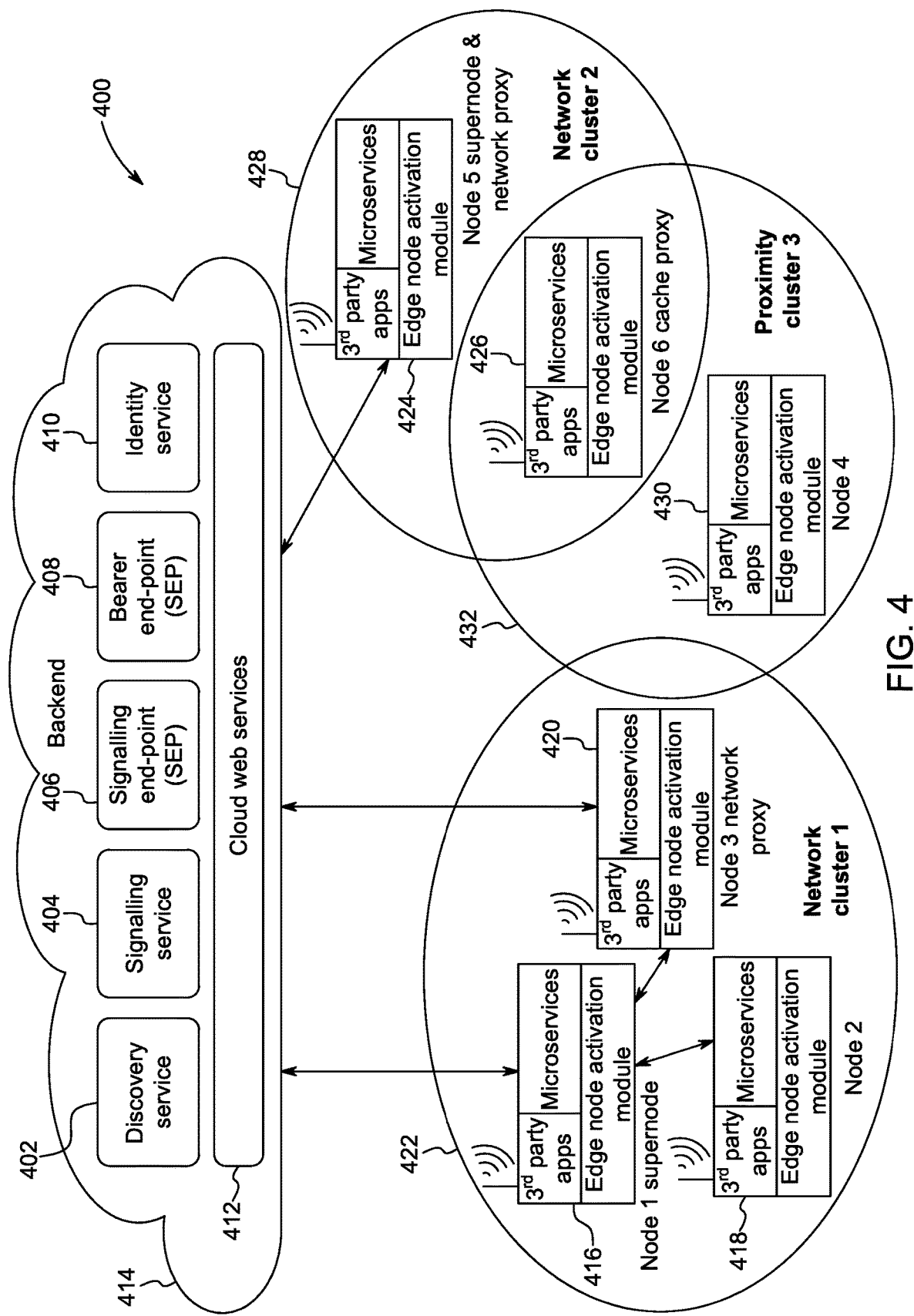
FIG. 4 shows an exemplary edge cloud architecture in accordance with an embodiment.

FIG. 4 shows an exemplary edge cloud architecture 400 in accordance with an embodiment. As described earlier, the value of decentralized cloud comes from distribution of services over the entire range, from central cloud (e.g. 106) all the way to the edge nodes. FIG. 4 shows a backend services module 414 that is configured to provide one or more backend services that include a discovery service 402, a signaling service 404, and an identity service 410. The signaling service 404 is configured to provide a signaling endpoint (SEP) 406 and a bearer endpoint (BEP) 408. The one or more backend services are hosted on cloud web services 416. The disclosed cloud architecture allows collaboration between the backend services module 414 and the one or more nodes in the cloud to form one or more clusters.

For example, FIG. 4 shows 3 clusters: a network cluster 1 (422), network cluster 2 (428) and a proximity cluster 3 (432). The network cluster 1 (422) includes 3 nodes: node 1 which is a supernode (416), node 2 (418) and node 3 which is a network proxy node (420). The network cluster 2 (428) includes 2 nodes: node 5 which is supernode and network proxy node 424 and node 6 which is a cache proxy node 426. The proximity cluster 3 (432) includes 2 nodes: node 4 (430) and node 6 which is a cache proxy node 426. As described earlier, each of these nodes include an edge node activation module, one or more microservices, and one or more 3rd party apps. The above-mentioned clusters were formed as a based on one or more scopes as described earlier. The network clusters 1 and 2 (422 and 428) were formed based on network as a scope and the proximity cluster 3 was formed based on proximity as a scope. Also, as shown in FIG. 4, a given node can be a part of 2 clusters, for example, node 6 which is a cache proxy node 426 is a part of network cluster 2 (428) and proximity cluster 3 (432). Various roles have been assigned to various nodes based on the considerations explained earlier.

Figure 5:
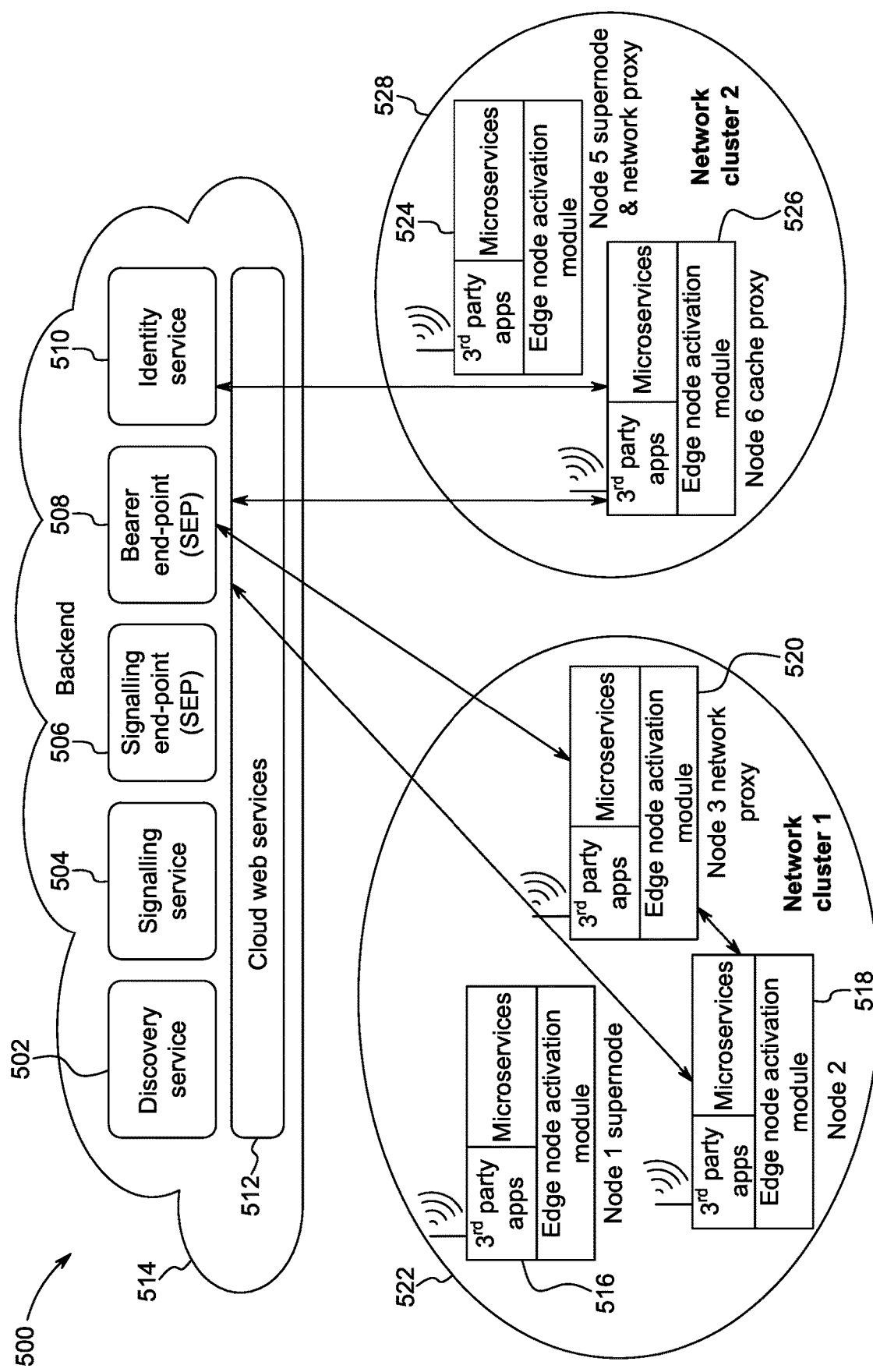
FIG. 5 shows exemplary embodiment of discovery, connection and communication for two edge cloud computing devices belonging to same user ID in an edge cloud architecture.

The mechanics of the signaling (SEP) and bearer (BEP) endpoints can be illustrated best via the example depicted in FIG. 5. FIG. 5 shows exemplary embodiment of a system 500 having discovery, connection and communication for two edge cloud computing devices belonging to same user ID. Similar to FIG. 4, FIG. 5 depicts a backend services module 514 configured to provide one or more backend services that include a discovery service 502, a signaling service 504, and an identity service 510 hosted on cloud web services 516. The signaling service 504 is configured to dynamically deploy resources such as a signaling endpoint (SEP) 506 and a bearer endpoint (BEP) 508.

FIG. 5 also shows 2 clusters: a network cluster 1 (522) and network cluster 2 (528). The network cluster 1 (522) includes 3 nodes: node 1 which is a supernode (516), node 2 (518) and node 3 which is a network proxy node (520). The network cluster 2 (528) includes 2 nodes: node 5 which is supernode and network proxy node 524 and node 6 which is a cache proxy node 526.

For the purposes of the ongoing description, it is assumed that two nodes (node 2 shown as 518 in network cluster 1 and node 6 shown as 526 in network cluster 2) belong to the same user (account) and have already registered with their respective link-local network clusters. It is to be noted that these two nodes although belonging to the same user account are part of two different clusters. The disclosed edge architecture provides the SEP 506 as a reachable endpoint for node 6 (526), that it can use to communicate with node 2 (518) as if it were directly accessible. The communication between these two nodes is performed in an inter-cluster fashion using the SEP 506. After the signaling is established, the BEP 508 is provided for the bulk of the exchange among the two nodes 518 and 526. The flexibility of separating signaling and bearer channels allows the creation of "service-specific" BEPs that are not restricted to HTTP based service delivery.

As described earlier, the process of discovery, connection and communication amongst nodes includes the first step of sending discovery requests (by a new node) to the supernode (e.g. 516) for nodes that belong to a scope (e.g. network). The process further includes the step of obtaining a list of nodes together with appropriate signaling information from the supernode. The process further includes sending requests to remote nodes (in different clusters) via SEP (e.g. 406, 506). The process also includes having remote nodes request BEP (e.g. 408, 508) for providing a service. The process concludes with the step of connecting and communicating to consume the service through the BEP provisioned.

Figure 6:
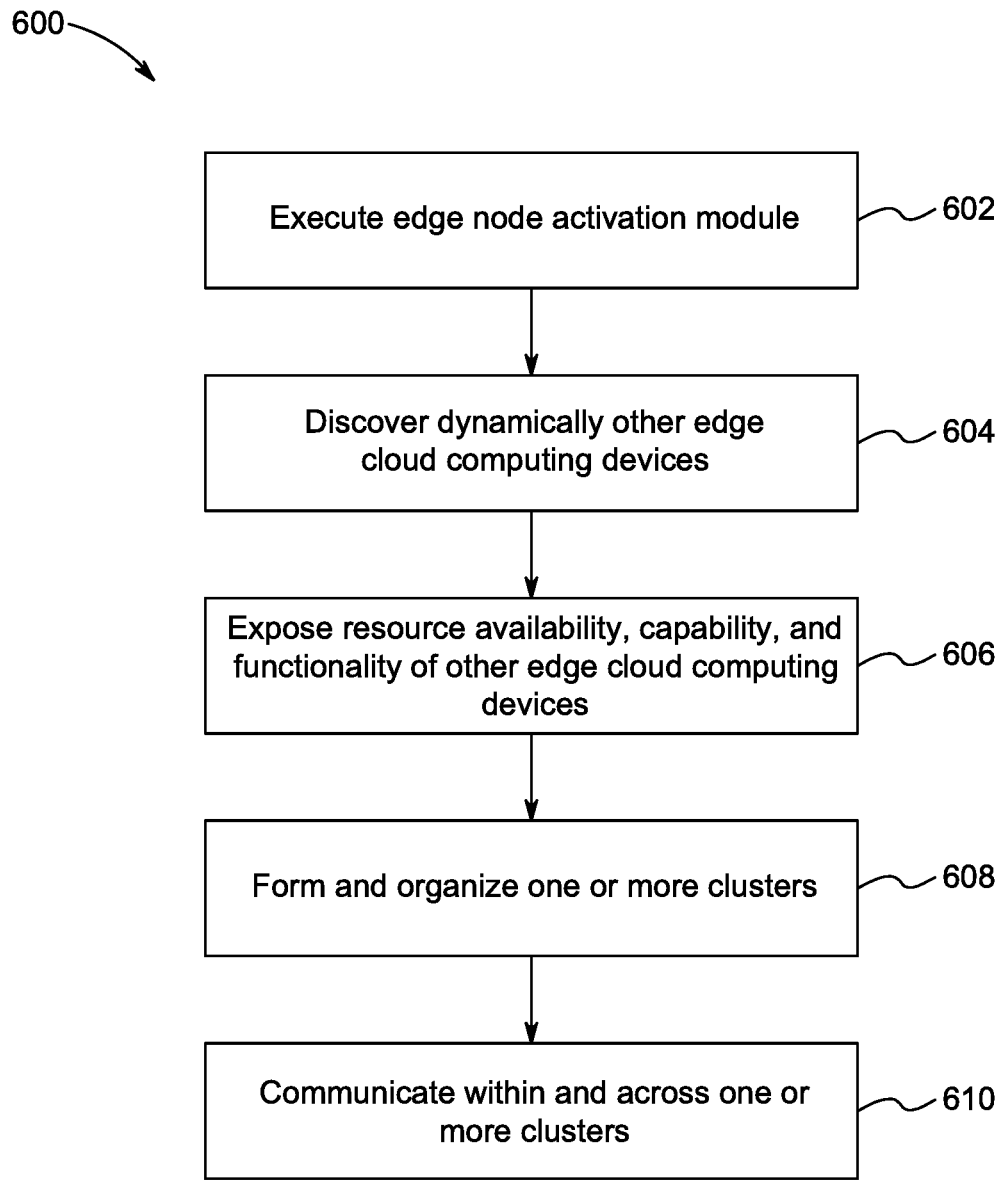
FIG. 6 shows an exemplary embodiment of a method of providing cloud computing infrastructure.

FIG. 6 shows an exemplary embodiment of a method 600 of providing cloud computing infrastructure or a platform. With reference to FIGS. 1-6, the edge cloud computing infrastructure is implemented in a communication network (e.g. edge cloud computing network 100) that includes one or more edge cloud computing devices (e.g. 102, 104) in communication with a server computing device (e.g. 112).

The method includes executing as in step 602, by a first edge cloud computing device (e.g. 204, 300), an edge node activation module (e.g. 222, 308). In an embodiment, the edge activation module is a software-level application downloadable by the first edge cloud computing device. The method further includes discovering dynamically as in step 604, by the first edge cloud computing device, other edge cloud computing devices (e.g. 110) independent of the operating system and network associated with the other edge cloud computing devices. The method further includes exposing as in step 606, by the first edge cloud computing device, resource availability, capability, and functionality of the discovered other edge cloud computing devices (e.g. 110). The method further includes forming and organizing as in step 608, by the first edge cloud computing device, one or more clusters (e.g. 422, 432) of the discovered other edge cloud computing devices. The method also includes communicating as in step 610, by the first edge cloud computing device, within the one or more clusters and across the one or more clusters.

In an embodiment, the method further includes, subsequent to executing the edge node activation module (e.g. 222), searching, by the first edge cloud computing device, for a super edge cloud computing device (or a supernode). As described earlier, the super edge cloud computing device is configured to manage globally discovery. The method further includes in an event of not finding a super edge computing device during the searching, designating, by the first edge cloud computing device, itself as the super edge computing device. In another embodiment, the method includes communicating, by the first edge cloud computing device, global discovery of its existence and receiving, by the first edge computing device, a list of one or more edge cloud computing devices within a scope of the first edge computing device.

In yet another embodiment, the method further includes receiving, by the first edge cloud computing device, a request for registration from one or more edge cloud computing devices entering subsequently in the one or more clusters. The method also includes transmitting, by the first edge computing device, to the registered one or more edge cloud computing devices a list of one or more other edge cloud computing devices within the scope of the first edge computing device.

Embodiments of a server computing device are disclosed. The embodiments relate to a communication network that includes one or more edge cloud computing devices in communication with the server computing device. In an embodiment, the server computing device includes a back-end services module configured to provide one or more services to support the one or more edge cloud computing devices. The one or more backend services include a discovery service configured to provide knowledge to form one or more clusters of the one or more edge cloud computing devices. Each of the one or more clusters include at least one super edge cloud computing device (or a super node). The one or more backend services further include a signaling service configured to dynamically deploy a Signaling Endpoint (SEP) and a Bearer Endpoint (BEP) for the one or more clusters upon receiving a request from the discovery service. The one or more backend services further include an identity service configured to create and maintain authentication profiles of the one or more edge cloud computing devices.

Once a first cluster is formed, the discovery service is configured to allow a new edge cloud computing device that is not part of the first cluster to register with the super edge cloud computing device corresponding to the first cluster. In an embodiment, the discovery service is further configured to allow each of the super edge cloud computing devices to register itself. In an embodiment, the knowledge to form one or more clusters includes profiles of the one or more clusters, details of computing resources associated with the one or more edge cloud computing devices forming the one or more clusters, status & location of the one or more edge cloud computing devices forming the one or more clusters, one or more services available on the one or more edge cloud computing devices forming the one or more clusters, end-to-end network topology to reach each edge cloud computing device forming the one or more clusters, and reachability of the one or more clusters.

In another embodiment, the discovery service is further configured to provide information associated with resources available in the communication network to dynamically deploy the one or more services on any available edge cloud computing device within the communication network in real-time. In yet another embodiment, the signaling service is configured to dynamically deploy the Signaling Endpoint (SEP) and the Bearer Endpoint (BEP) based on a demand for computing resources within the one or more clusters.

In still further embodiment, the Signaling Endpoint (SEP) is used for signaling communication and the Bearer Endpoint (BEP) is used for data communications. The dynamic deployment of the Signaling Endpoint (SEP) and the Bearer Endpoint (BEP) increases signaling bandwidth and data bandwidth for the one or more edge cloud computing devices in the one or more clusters. The signaling service is further configured to dynamically deploy the Signaling Endpoint (SEP) and the Bearer Endpoint (BEP) based on one or more parameters. The one or more parameters include time to go-live for the one or more services, number of concurrent connections in the one or more clusters, and one or more communication protocols associated with the one or more edge cloud computing devices in the one or more clusters.

In an embodiment, the signaling service is further configured to dynamically deploy the Signaling Endpoint (SEP) and the Bearer Endpoint (BEP) on an available edge cloud computing device within the closest proximity of the one or more clusters. The identity service is configured to generate and maintain a token for one or more of: an edge node activation module in each edge cloud computing device, a microservice using the edge node activation module, an application developer using the edge node activation module and an end-user of an application supported by the edge node activation module. In yet another embodiment, the identity service is configured to verify credentials and legitimacy of a token holder and authorize the token holder's access to the one or more services provided by the backend services module.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

The invention claimed is:

1. An edge cloud computing device, comprising:
   an edge node activation processor configured to:
   discover one or more other edge cloud computing devices based on a first set of parameters to establish a connection therebetween, wherein the discovery of the one or more edge cloud computing devices is independent of a network type associated with the one or more edge cloud computing devices, and wherein the discovered one or more other cloud computing devices are configured to elect a super edge cloud computing device; and
   provide a microservice runtime environment to execute one or more microservices associated with the connection established between one or more edge cloud computing devices, wherein the super edge cloud computing device is configured to maintain information related to the one or more microservices deployed on the discovered one or more edge cloud computing devices,
provide flexible container capabilities based at least in part on respective computing environments associated with the one or more edge cloud computing devices, wherein the respective computing environments run a container daemon to download, deploy, and operate the one or more microservices;
wherein the edge node activation processor comprises a webserver embedded there within, and wherein the webserver is configured to provide container management APIs using specific language based on an operating system associated with the edge cloud computing device.

2. The edge cloud computing device as claimed in claim 1, wherein the edge node activation processor is further configured to:
discover an existence of the one or more edge cloud computing devices regardless of an operating system associated with the one or more edge cloud computing devices; discover capabilities and behaviour associated with the one or more edge cloud computing devices; and
discover the one or more microservices supported by the one or more edge cloud computing devices.

3. The edge cloud computing device as claimed in claim 1, wherein the first set of parameters comprises:
a user account associated with each of the one or more edge cloud computing devices, a network associated with the one or more edge cloud computing devices, and a proximity of the one or more edge cloud computing devices.

4. The edge cloud computing device as claimed in claim 1, wherein the edge node activation processor is further configured to:
dynamically form one or more clusters with the one or more edge cloud computing devices; and communicate with the one or more edge cloud computing devices at a microservice level either directly or through other edge cloud computing devices across the one or more clusters.

5. The edge cloud computing device as claimed in claim 1, wherein the edge node activation processor is further configured to connect with the discovered one or more edge cloud computing devices when the discovered one or more edge cloud computing devices chose to share data, services, and/or resources.

6. The edge cloud computing device as claimed in claim 1, wherein the edge node activation processor is further configured to expose the one or more microservices through a common embedded web server.

7. The edge cloud computing device as claimed in claim 1, wherein one or more API endpoints for each microservice are accessible from the one or more edge cloud computing devices in a cluster through an API gateway.

8. The edge cloud computing device as claimed in claim 1 is configured as one or more of: a PC, a set-top-box, a IoT gateway, a game console connected TV, a car infotainment system, a smart phone, a laptop, a smartwatch, a PDA, and combinations thereof.

* * * * *